Patented Dec. 7, 1948

2,455,528

UNITED STATES PATENT OFFICE 2,455,528

ACCELERATING VULCANIZATION OF RUBBER

Raymond B. Seymour, Dayton, Ohio, assignor to Monsanto Chemical Company, St. Louis, Mo., a corporation of Delaware No Drawing. Application July 11, 1945,
Serial No. 604,505

8 Claims. (Cl. 260—784)

The present invention relates to new and improved accelerators for the vulcanization of a rubber, to a process of vulcanizing a rubber or rubber containing material and to the vulcanized rubber products obtained with the aid of the new accelerators.

In accordance with the present invention it has been discovered that thiazyl thio methyl substituted amino triazines are valuable accelerators of vulcanization. These products may also be defined as the thiazyl thio ethers of triazine-formaldehyde reaction products. Examples of suitable thiazyl ether forming groups are benzothiazyl-, thiazyl-, methyl thiazyl-, 4 phenyl benzothiazyl- and 2-chlor benzothiazyl-.

Typical examples of amino triazines suitable for the preparation of the new accelerators comprise melamine, chlorinated, alkylated and phenylated melamines, ammeline and ammelide.

Thiazyl thio ethers of amino triazine-formaldehyde reaction products may be prepared by converting amino triazines to methylol compounds by reaction with formaldehyde and condensing the methylol compound so formed with a mercapto thiazole, water being removed in the reaction. Alternatively, the mercapto thiazole may be converted to a methylol compound by reaction with formaldehyde and the methylol thio benzothiazole condensed with an amino triazine.

The following example illustrates the preparation and use of the new accelerators but it is to be understood that the invention is not limited thereto.

Example

Substantially 107 parts by weight of mercaptobenzothiazole of 94% purity (substantially 0.6 molecular proportion) was dissolved in a hot alcohol solution of formaldehyde consisting of 51 parts by weight of 37% formaldehyde (0.63 molecular proportion) and 120 parts by weight of alcohol. The alcohol solution was rendered neutral by the addition of dilute sodium hydroxide prior to the addition of the mercaptobenzothiazole. Substantially 12.6 parts by weight (0.1 molecular proportion) of melamine was then added. Solution was complete after stirring for a short time. Stirring and heating at refluxing temperature was continued for 24 hours. After about an hour the solution became turbid and an oily solid slowly precipitated. This had crystallized by the end of 24 hours and the crystalline product was then filtered off after cooling the reaction mixture to room temperature. In order to remove any unreacted mercaptobenzothiazole the filter cake was ball milled 4 hours with 315 parts by weight of approximately 1.2% caustic soda. The product was filtered off, washed free of alkali and dried at 50° C. The yellow crystalline product had a melting point of 225–227° C. with decomposition. Analysis showed three mols of methylol thio benzothiazole combined with one mol of melamine. Thus analysis for sulfur gave 29.3% as compared to 28.9% calculated for tri(benzothiazyl thio methyl) melamine. The probable structural formula of the product is

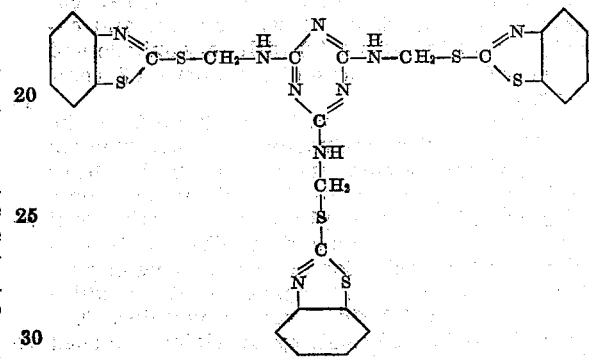

The new compounds exert valuable accelerating properties when incorporated into vulcanizable rubber compositions and are preferably used in conjunction with basic nitrogen containing accelerators as activators thereof. As illustrative of the accelerating properties of the new products rubber stocks were compounded comprising

|  | Stock | |
|---|---|---|
|  | A | B |
|  | Parts by weight | Parts by weight |
| Pale crepe rubber | 100 | 100 |
| Zinc oxide | 5 | 5 |
| Sulfur | 3 | 3 |
| Stearic acid | 0.5 | 0.5 |
| Tri(benzothiazyl thio methyl) melamine | 0.75 | 0.6 |
| Diphenyl guanidine |  | 0.15 |

The stocks so compounded were vulcanized in the usual manner by heating in a press for different periods of time at the temperature of 20 pounds steam pressure per square inch. The physical properties of the cured products are set forth below:

| Stock | Cure Time in Mins. | Modulus of Elasticity in lbs./in.² at Elongations of— | | Tensile at Break in lbs./in.² | Ultimate Elongation, percent |
|---|---|---|---|---|---|
| | | 500% | 700% | | |
| A | 60 | 150 | 480 | 1,765 | 935 |
| A | 90 | 200 | 790 | 1,915 | 870 |
| B | 30 | 310 | 1,150 | 2,360 | 815 |
| B | 60 | 625 | 2,700 | 3,285 | 745 |
| B | 90 | 755 | 3,340 | 3,800 | 730 |

It will be noted that the new accelerators are unusually susceptible to basic activation.

Other basic nitrogen containing accelerators may be used in conjunction with the new accelerators as activators thereof. Examples comprise di-o-tolyl guanidine, thiocarbanilide, hexamethylene tetramine, para phenylene diamine, anhydro formaldehyde aniline, diphenyl guanidine phthalate, triphenyl guanidine, butylaldehyde aniline, dibutyl amine oleate and dicyclohexylamine oleate.

The accelerators of this invention are effective in the vulcanization of any sulfur vulcanizable rubbery material and the term "a rubber" as employed in the present specification and attached claims is intended to include such materials generally. Rubbery products are characterized by elasticity which is that property of a rubber which causes it to resist deformation and thereby recover its original size and shape after the deforming force is removed. Examples of a rubber are india rubber, reclaimed rubber, balata, gutta percha, butadiene-1,3 polymer, copolymers of butadiene-1,3 with styrene and copolymers of butadiene-1,3 with acrylonitrile and other rubbery polymers of butadiene-1,3 compounds.

The present invention is not limited to the specific examples hereinbefore set forth wherein the preferred accelerators are employed. Other ratios of the compounding ingredients than those mentioned in the examples as well as other well known fillers, pigments and the like may be employed in the production of various types of rubber compounds and are apparent to those skilled in the art to which this invention pertains. The invention is limited solely by the claims attached hereto as part of the present specification.

What is claimed is:

1. The process of vulcanizing a rubber which comprises heating a rubber and sulfur in the presence of a 2-thiazylthiomethyl substituted melamine of the structure.

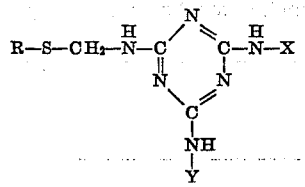

where R is a 2-thiazyl group and X and Y represent a material of the group consisting of hydrogen and —CH₂—S—R groups.

2. The process of vulcanizing a rubber which comprises heating a rubber and sulfur in the presence of a 2-benzothiazylthiomethyl substituted melamine of the structure

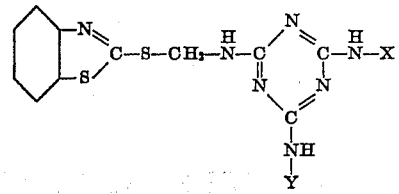

where X and Y represent a material of the group consisting of hydrogen and

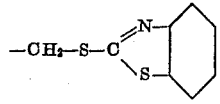

radicals.

3. The process of vulcanizing a rubber which comprises heating a rubber and sulfur in the presence of a tri-2-arylenethiazylthiomethyl substituted melamine of the structure

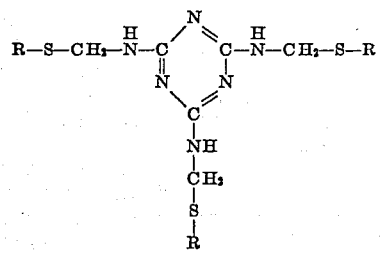

where R is a 2-arylenethiazyl group.

4. The process of vulcanizing a rubber which comprises heating a rubber and sulfur in the presence of tri(benzothiazyl thio methyl) melamine of the structure

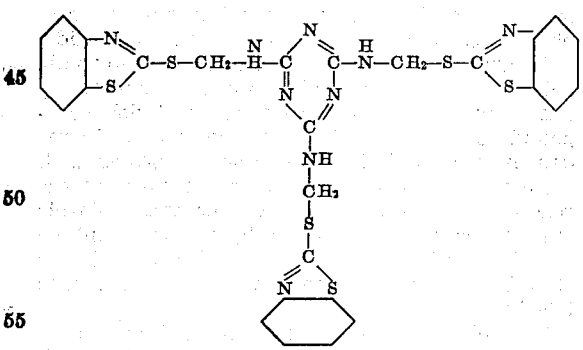

5. The vulcanized rubber product obtained by heating rubber and sulfur in the presence of a 2-thiazylthiomethyl substituted melamine of the structure

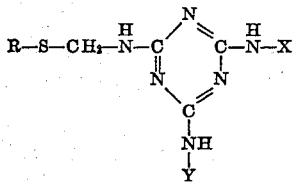

where R is a 2-thiazyl group and X and Y represent a material of the group consisting of hydrogen and —CH₂—S—R groups.

6. The vulcanized rubber product obtained by heating rubber and sulfur in the presence of a 2-benzothiazylthiomethyl substituted melamine of the structure

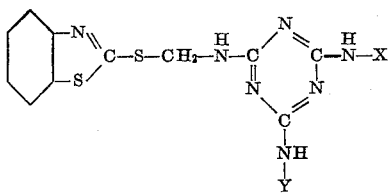

where X and Y represent a material of the group consisting of hydrogen and

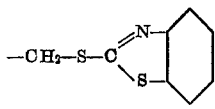

radicals.

7. The vulcanized rubber product obtained by heating rubber and sulfur in the presence of a tri-2-arylenethiazylthiomethyl substituted melamine of the structure

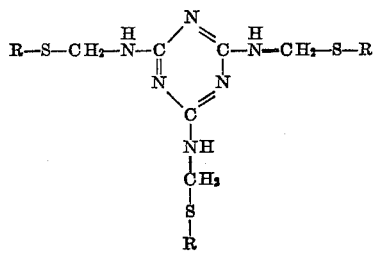

where R is a 2-arylenethiazyl group.

8. The vulcanized rubber product obtained by heating rubber and sulfur in the presence of tri (benzothiazyl thio methyl) melamine of the structure

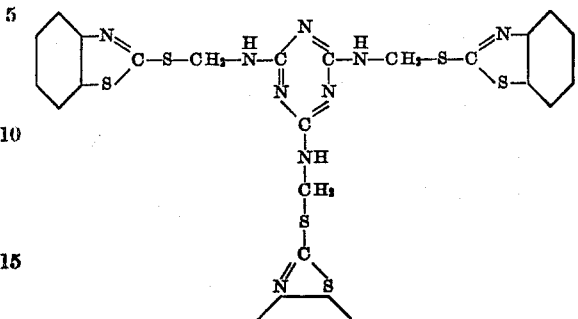

RAYMOND B. SEYMOUR.

REFERENCES CITED

The following references are of record in the file of this patent:

UNITED STATES PATENTS

| Number | Name | Date |
|---|---|---|
| 1,874,886 | Banbury et al. | Aug. 30, 1932 |
| 2,134,957 | Sebrell | Nov. 1, 1938 |
| 2,295,567 | D'Alelio et al. | Sept. 15, 1942 |

FOREIGN PATENTS

| Number | Country | Date |
|---|---|---|
| 651,763 | Germany | Oct. 19, 1937 |